(12) United States Patent
Savilampi

(10) Patent No.: US 7,517,098 B2
(45) Date of Patent: Apr. 14, 2009

(54) METHOD, SYSTEM, APPARATUS AND SOFTWARE PRODUCT FOR PRESENTATION NOTES MODE

(75) Inventor: Erkki Savilampi, Lempäälä (FI)

(73) Assignee: Nokia Corporation, Espoo (FI)

( * ) Notice: Subject to any disclaimer, the term of this patent is extended or adjusted under 35 U.S.C. 154(b) by 220 days.

(21) Appl. No.: 11/222,242

(22) Filed: Sep. 7, 2005

(65) Prior Publication Data

US 2007/0052937 A1  Mar. 8, 2007

(51) Int. Cl.
| G03B 21/00 | (2006.01) |
| G03B 23/00 | (2006.01) |
| G09G 5/00  | (2006.01) |
| G09G 3/04  | (2006.01) |
| G06F 3/048 | (2006.01) |
| H04N 5/445 | (2006.01) |

(52) U.S. Cl. .................. 353/121; 353/25; 353/68; 345/1.3; 345/33; 345/156; 345/619; 345/902; 715/730; 715/764; 715/781; 725/43

(58) Field of Classification Search ............... 353/121, 353/25, 27 A, 28, 42, 68; 345/1.1, 1.3, 33, 345/156, 531, 619, 902; 709/200, 205, 223; 715/707, 708, 730, 764, 781; 725/43
See application file for complete search history.

(56) References Cited

U.S. PATENT DOCUMENTS

| 5,736,968 | A  |   | 4/1998 | Tsakiris |
| 2003/0179154 | A1 | * | 9/2003 | Demsky et al. ............. 345/1.1 |
| 2005/0099432 | A1 |   | 5/2005 | Chavis et al. |
| 2005/0102360 | A1 |   | 5/2005 | Chavis et al. |
| 2006/0075348 | A1 |   | 4/2006 | Xu et al. |
| 2006/0079214 | A1 | * | 4/2006 | Mertama et al. ......... 455/414.1 |

FOREIGN PATENT DOCUMENTS

EP  1526445 A2  4/2005

OTHER PUBLICATIONS http://office.microsoft.com/en-us/assistance/HP052368601033.aspx (downloaded Apr. 15, 2005) via the Internet.

* cited by examiner

*Primary Examiner*—Rochelle-Ann J Blackman

(57) ABSTRACT

A method, apparatus, system, and software product are presented for displaying notes to a presenter, in order to facilitate narration of a presentation. The items such as slides are shown seriatim on an audience screen, and are also displayed seriatim on a presenter screen. Some of the items on the presenter screen are accompanied by respective areas for the notes, whereas the items are shown on the audience screen unaccompanied by the areas for the notes.

26 Claims, 3 Drawing Sheets

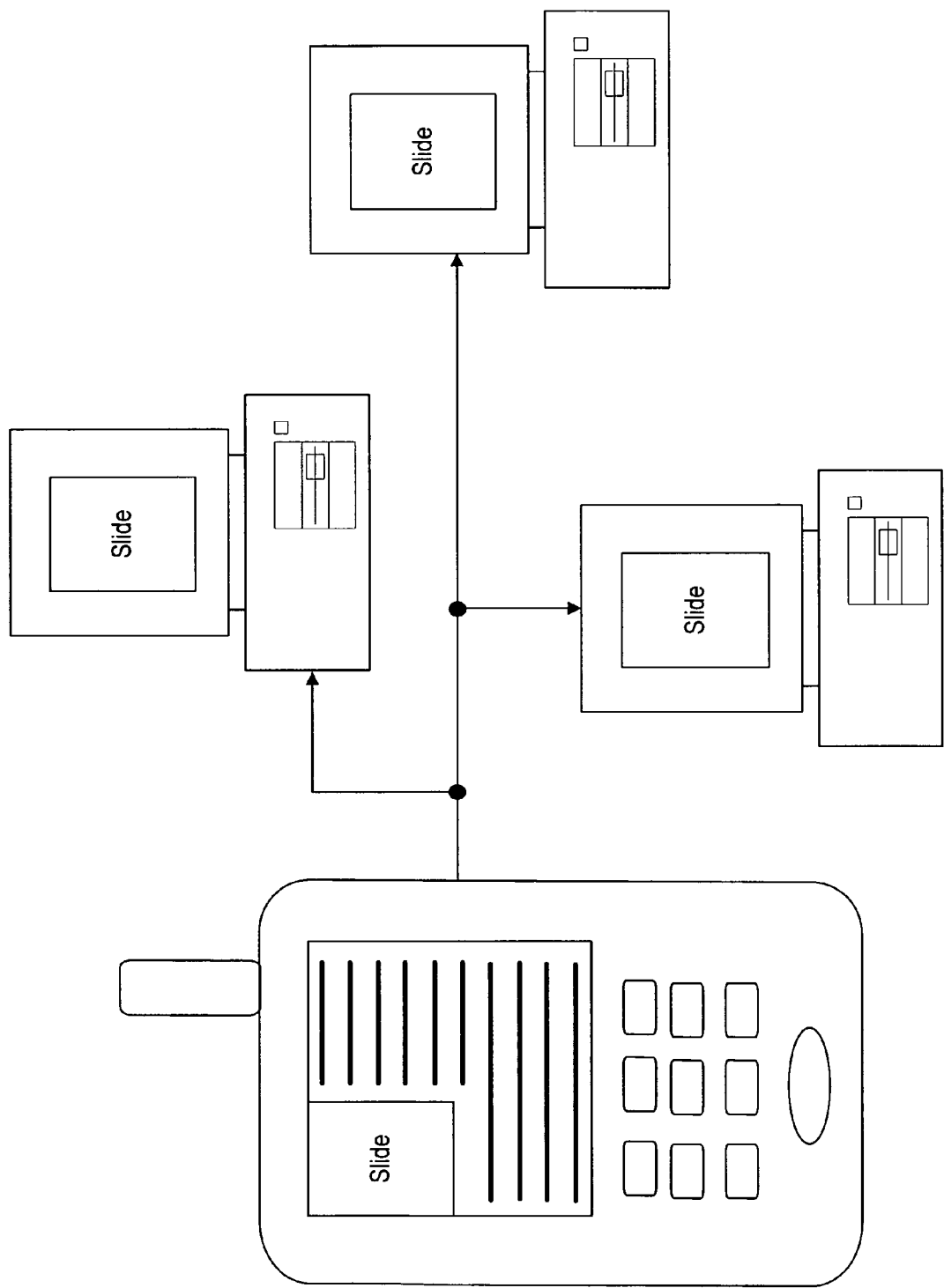

METHOD, SYSTEM, APPARATUS AND SOFTWARE PRODUCT FOR PRESENTATION NOTES MODE

FIELD OF THE INVENTION

The present invention relates to projecting slides or a slideshow to an audience using a computer device, and relates especially to the accompanying notes that the speaker has prepared.

BACKGROUND OF THE INVENTION

A slide presentation is typically best when the slideshow displayed to the audience contains only a couple of items, such as a simple piece of text and an image. In other words, the less content the better. However, this causes a problem: the presenter will need to know or remember a great deal, in order to explain, discuss, and elaborate upon the slides while they are being shown to the audience. This spoken element is essential to make a successful presentation.

Normally, the presenter cannot see his notes on his laptop screen while presenting a slideshow or sets of slides to the audience. Instead, the presenter needs to keep a separate set of paper notes during the presentation, for instance. In a normal presentation, the whole screen will be displayed to the audience, including all the contents of the device display. Note that, in a personal computer (PC) or IBM laptop, one can switch display modes by pressing a blue Fn key and an F7 function key, but as of now those display modes do not include a mode allowing the user to see the user's private notes alongside a public slide show.

When a speaker would like to see the notes he has prepared, he usually has to take the notes with him as paper copies. However, it would be more practical to be able to see the notes from the display without having to reveal them to the audience or read from papers.

MICROSOFT OFFICE ONLINE allows a user to hide the outline and notes on a Web presentation. See http://office.microsoft.com/en-us/assistance/HP052368601033.aspx (downloaded Apr. 15, 2005). Likewise, in Power Point, there is a "Hide Slide" function under "Slide Show," so that some slides can be hidden during the presentation. One can also "Define Custom Show," in order to select only a part of a whole slide show to be presented. A normal presentation is where the whole screen will be displayed to the audience.

Consider the NOKIA Wireless Presenter which allows a user to wirelessly access a Windows desktop and applications via Bluetooth with a series 60 mobile phone. The series 60 phone can then control PowerPoint presentations, and view titles and speaker notes on the mobile phone. This prior art needs two devices in order to function, or three if the overhead projector is included as well.

SUMMARY OF THE INVENTION

A terminal display is configured to display only a part of the physical screen to the audience, while leaving the rest of the display visible only to the user of the terminal. Part of the display is defined as displayable, so that this area will be projected to the screen for the audience to view. The rest of the display is defined to be non-displayable.

This present invention allows the presenter to view notes added to the slides without showing them to the audience. The presenter is typically facing away from the screen towards the audience, so it is convenient to read the presenter's notes from the screen of his laptop.

The invention is also applicable to devices with smaller screens: the slide to be displayed can be the size of a stamp on a communicator screen, while displaying all notes in greater size and detail.

Because a typical laptop has different modes of display (e.g. invoked with the Fn-F7 key combination), the present invention could be considered as an additional display mode applicable to various different software programs. The main idea is to define an area, depending on the application and windows within the application, which will be displayed or shared with an audience (or net-meeting) while not displaying or sharing the whole display contents to the other viewers.

With regard to a net-meeting, assume a slideshow has notes in it. When the presenter shares the slideshow with other participants, the notes would not be visible to the other viewers on their screens, although they would be visible on the presenter's screen.

Thus, the present method, apparatus, system, and software product facilitate displaying notes to a presenter, in order to assist narration of a presentation. The items are shown seriatim on an audience screen, and are also displayed seriatim on a presenter screen. At least some of the items on the presenter screen are accompanied by respective areas for the notes, whereas the items are shown on the audience screen unaccompanied by the areas for the notes.

BRIEF DESCRIPTION OF THE DRAWINGS

FIG. 3 is a system according to an embodiment of the present invention.

DETAILED DESCRIPTION OF THE INVENTION

Figure 1:
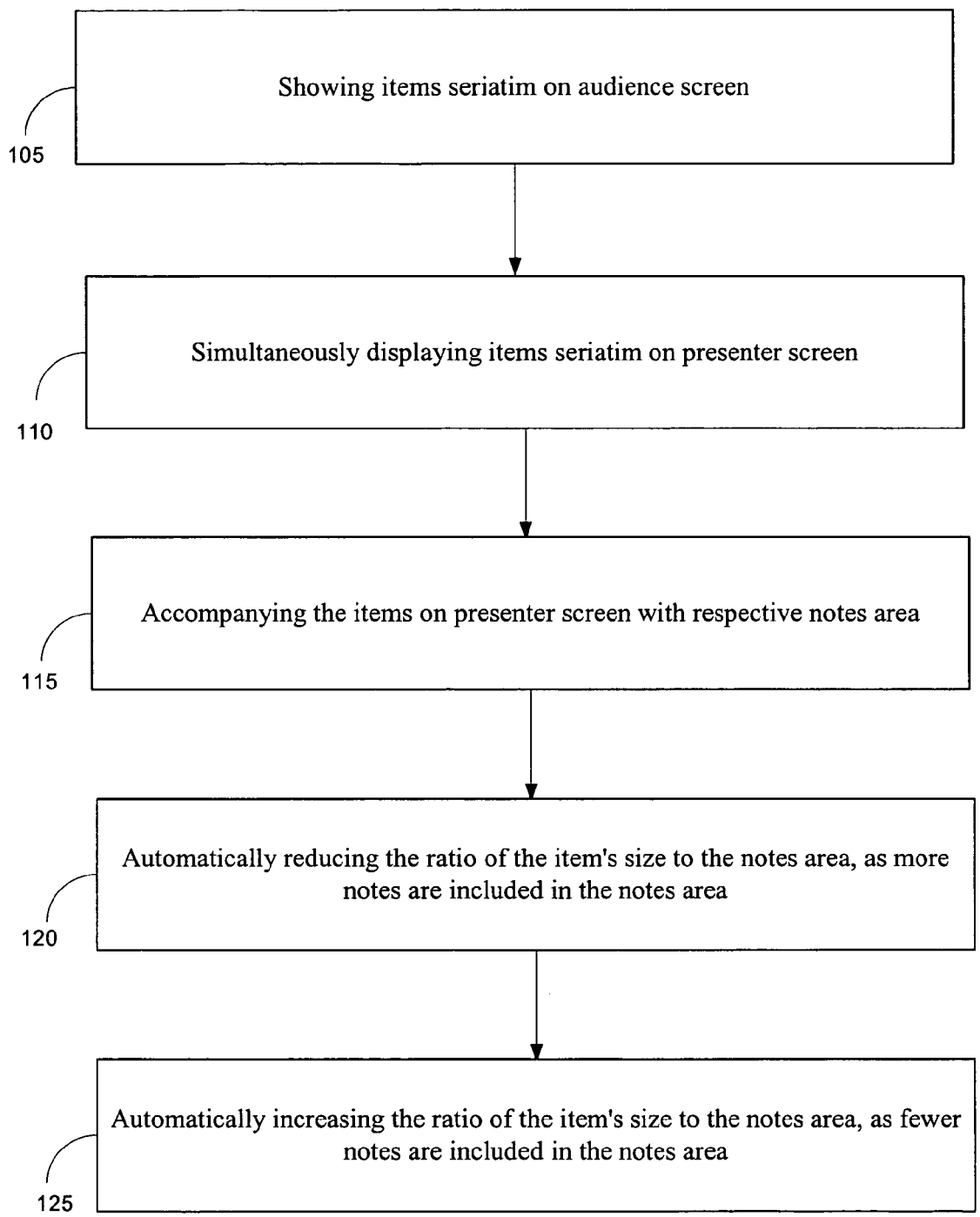
FIG. 1 is a flow chart showing an embodiment of the invention.

Several embodiments of the present invention are illustrated in the figures, in order to help more fully explain the inventive concept and how it can be put into practice. FIG. 1 shows a method 100 that begins by showing 105 items such as slides, one at a time on at least one audience screen. Simultaneously, the items are displayed 110 seriatim on a presenter screen. The items are respectively accompanied 115 by a notes area on the presenter screen. As more notes are included in the notes area of the presenter screen, the ratio of the item's size to the notes area is automatically reduced 120 so that there will be more room for the notes. Likewise, when there are fewer notes in a notes area, the ratio is automatically increased 125. If there are no notes for a particular slide, then the notes are can be omitted (i.e. the ratio goes to infinity).

There are other ways to accommodate additional notes for a particular slide, such as allowing the presenter to scroll down to see more notes, or allowing the presenter to go to a second page of notes for a particular slide. In any event, the notes are shown to the presenter, but not to the audience.

Figure 2:
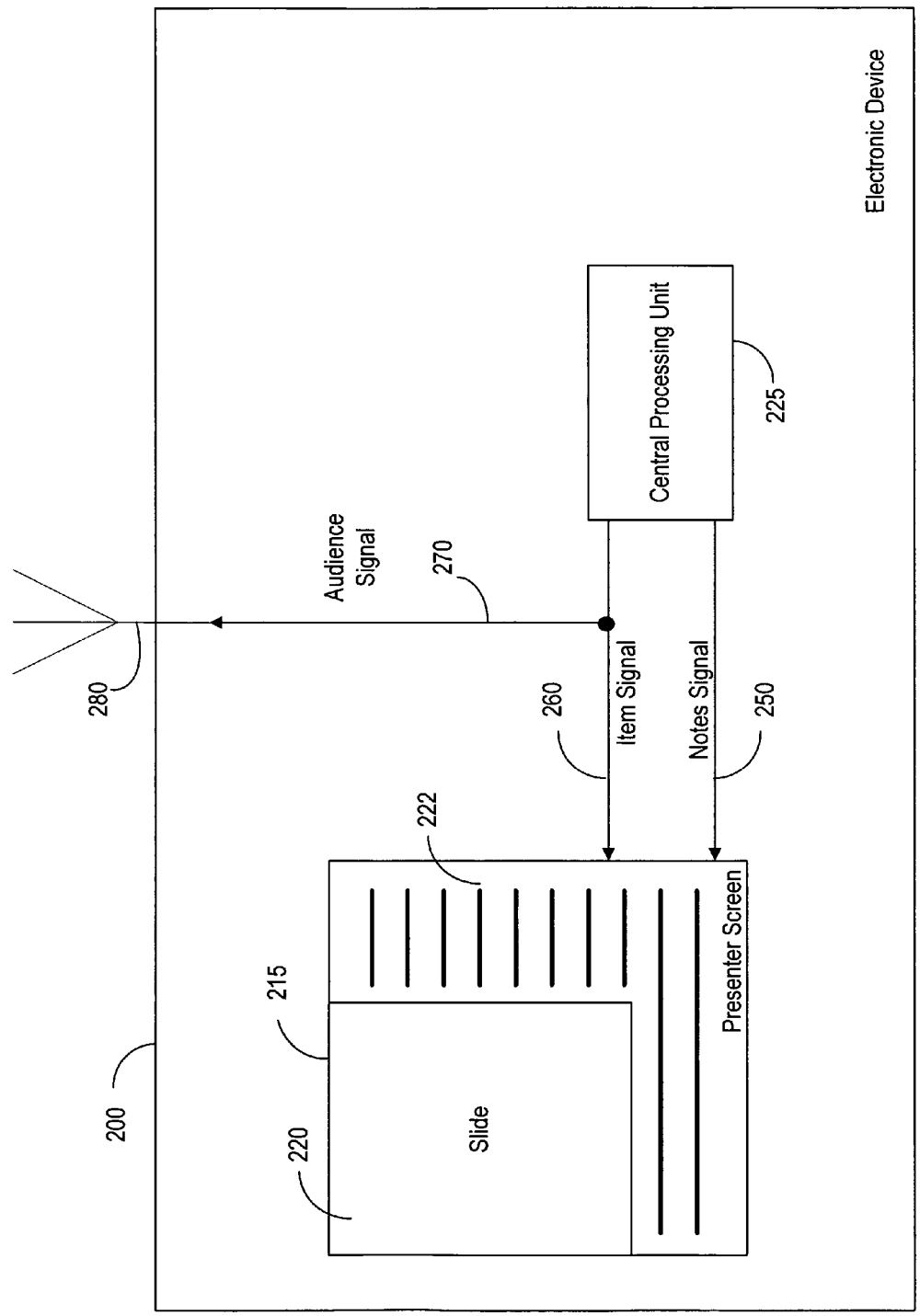
FIG. 2 is a diagram of an electronic device according to an embodiment of the present invention.

FIG. 2 illustrates an electronic device 200 according to an embodiment of the present invention. This device could be, for example, a wireless telephone held by the presenter while he or she gives a slide presentation. Each slide 220 is shown on the device's display screen 215. Also shown on the display screen are notes 222 corresponding to the slide 220. In this embodiment, the notes are provided by a central processing unit 225 to the screen by a notes signal 250, whereas the slide is provided by an item signal 260. The information in the item signal 260 is also provided as an audience signal 270 to an audience for display on their screen(s), via the antenna 280.

Referring now to FIG. 3, this shows a wireless telephone that is used by the slideshow presenter. Each slide is accompanied by the presenter's notes, so that the presenter can more conveniently narrate the presentation. Meanwhile, the audience may consist of several people watching a single screen, or, as shown in FIG. 3, the audience may include several people who watch their separate desktop displays. In either case, the audience does not see the presenter's notes.

It is to be understood that all of the present figures, and the accompanying narrative discussions of best mode embodiments, do not purport to be completely rigorous treatments of the method, system, mobile device, and software product under consideration. A person skilled in the art will understand that the steps and signals of the present application represent general cause-and-effect relationships that do not exclude intermediate interactions of various types, and will further understand that the various steps and structures described in this application can be implemented by a variety of different sequences and configurations, using various different combinations of hardware and software which need not be further detailed herein.

What is claimed is:

1. A method comprising:
    showing slides on at least one audience screen;
    displaying each of the slides on a presenter screen;
    accompanying a plurality of the slides on the presenter screen with respective areas for notes; and
    miniaturizing at least one of the slides on the presenter screen to provide the respective areas for the notes,
    wherein the plurality of the slides are shown on the at least one audience screen unaccompanied by the areas for the notes.

2. The method of claim 1, wherein a user interface allows alteration of the ratio of a slide size to the respective area for the notes.

3. The method of claim 2, wherein the ratio automatically decreases as the user adds more notes in the area for the notes, or automatically increases as the user makes deletions in the area for the notes, and wherein the notes are editable by the user.

4. The method of claim 1, wherein the showing is timed to automatically coincide with the displaying.

5. The method of claim 1, wherein each of the slides is shown and displayed by providing a slide signal to the at least one audience screen and the presenter screen, respectively, and wherein the area for notes is provided to the presenter screen by a notes signal that is only sent to the presenter screen.

6. The method of claim 1, wherein at least one of the slides is displayed on the presenter screen unaffected by scrolling the respective area for the notes.

7. The method of claim 1, wherein at least one of the areas for the notes includes a first page of notes that is continued by a second page of notes, and wherein the second page of notes is accompanied on the presenter screen by the slide that accompanied the first page of notes,
    the first page of notes and the second page of notes being for said slide.

8. A system, comprising:
    at least one audience screen configured to show slides;
    a presenter screen configured to display each of the slides; and
    at least one portion of the presenter screen configured to accompany a plurality of the slides with respective areas for notes;
    wherein the audience screen is arranged to show the plurality of the slides unaccompanied by the areas for the notes, and
    wherein the plurality of the slides on the presenter screen are miniaturized to provide the respective areas for the notes.

9. The system of claim 8, wherein a user interface allows alteration of the ratio of a slide size, on the presenter screen, to the respective area for the notes.

10. An apparatus, comprising:
    a presenter screen configured to display slides; and
    at least one portion of the presenter screen configured to accompany a plurality of the slides with respective areas for notes;
    wherein the apparatus is also configured to provide an audience signal indicative of each of the plurality of the slides unaccompanied by the areas for the notes, and
    wherein the plurality of the slides displayed on the presenter screen are miniaturized to provide the respective areas for the notes.

11. The apparatus of claim 10, wherein a user interface allows alteration of the ratio of at least one slide size on the presenter screen to the respective area for notes.

12. The apparatus of claim 11, wherein the ratio automatically decreases as the user adds more notes in the area for the notes, or automatically increases as the user makes deletions in the area for the notes.

13. The apparatus of claim 11, wherein the ratio is different for at least two of the slides.

14. The apparatus of claim 11, wherein the ratio is infinite for a slide that is unaccompanied by the notes.

15. The apparatus of claim 10, wherein the audience signal is timed to coincide with displaying the slides respectively on the presenter screen.

16. The apparatus of claim 10, wherein at least one of the slides is displayed on the presenter screen unaffected by scrolling the respective area for the notes.

17. The apparatus of claim 10, wherein at least one of the areas for the notes includes a first page of notes that is continued by a second page of notes, and wherein the second page of notes is accompanied on the presenter screen by the slide that accompanied the first page of notes, the first page of notes and the second page of notes being for said slide.

18. A software product for use in an electronic device, the software product comprising a computer readable medium having executable codes embedded therein; the codes, when executed, adapted to carry out the functions of:
    transmitting slides to be shown on at least one audience screen that is separate from the electronic device;
    displaying each of the slides on a presenter screen of the electronic device; and
    accompanying a plurality of the slides on the presenter screen with respective areas for the notes;
    wherein the plurality of the slides are transmitted to be shown on the at least one audience screen unaccompanied by the areas for the notes, and
    wherein the plurality of the slides on the presenter screen are miniaturized to provide the respective areas for the notes.

19. The software product of claim 18, wherein a user interface allows alteration of the ratio of a slide size to the respective area for the notes.

20. The software product of claim 19, wherein the ratio automatically decreases as the user adds more notes in the area for the notes, or automatically increases as the user makes deletions in the area for the notes, and wherein the notes are editable by the user.

21. The software product of claim 18, wherein the showing is timed to automatically coincide with the displaying.

22. The software product of claim 18, wherein each of the slides is shown and displayed by providing a slide signal to the at least one audience screen and the presenter screen, respectively, and wherein the area for notes is provided to the presenter screen by a notes signal that is only sent to the presenter screen.

23. The software product of claim 18, wherein at least one of the slides is displayed on the presenter screen unaffected by scrolling the respective area for the notes.

24. The software product of claim 18, wherein at least one of the areas for the notes includes a first page of notes that is continued by a second page of notes, and wherein the second page of notes is accompanied on the presenter screen by the slide that accompanied the first page of notes, the first page of notes and the second page of notes being for said slide.

25. An apparatus, comprising:
means for displaying slides; and
means for accompanying a plurality of the slides with respective areas for notes;
wherein the apparatus is also for providing an audience signal indicative of each of the plurality of the slides unaccompanied by the areas for the notes, and
wherein the plurality of the slides displayed on the means for displaying slides are miniaturized to provide the respective areas for the notes.

26. The apparatus of claim 25, further comprising means for allowing alteration of the ratio of at least one slide size to the respective area for notes.

* * * * *